(12) United States Patent
Lindgren et al.

(10) Patent No.: US 12,252,078 B2
(45) Date of Patent: Mar. 18, 2025

(54) INSULATING ELEMENT

(71) Applicant: SIKA TECHNOLOGY AG, Baar (CH)

(72) Inventors: Henrik Lindgren, Feluy (BE); Dimitri Marcq, Tubize (BE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 18/017,913

(22) PCT Filed: Sep. 7, 2021

(86) PCT No.: PCT/EP2021/074607
§ 371 (c)(1),
(2) Date: Jan. 25, 2023

(87) PCT Pub. No.: WO2022/053463
PCT Pub. Date: Mar. 17, 2022

(65) Prior Publication Data
US 2023/0278505 A1 Sep. 7, 2023

(30) Foreign Application Priority Data
Sep. 14, 2020 (EP) .................... 20195906

(51) Int. Cl.
*B60R 13/08* (2006.01)
*B62D 25/00* (2006.01)
(Continued)

(52) U.S. Cl.
CPC ............ *B60R 13/08* (2013.01); *B62D 65/022* (2013.01); *B62D 25/00* (2013.01); *B62D 29/002* (2013.01)

(58) Field of Classification Search
CPC ........... C23C 4/04; C23C 4/134; C23C 24/08; A46B 9/005; A46B 2200/3093;
(Continued)

(56) References Cited

U.S. PATENT DOCUMENTS 5,266,133 A   11/1993   Hanley et al.
5,373,027 A   12/1994   Hanley et al.
(Continued)

FOREIGN PATENT DOCUMENTS

DE  10 2006 032 480 A1   1/2008
EP       0 204 970 A2    12/1986
(Continued)

OTHER PUBLICATIONS

Dec. 20, 2021 International Search Report issued in International Patent Application No. PCT/EP2021/074607.
(Continued)

*Primary Examiner* — Lawrence Averick
(74) *Attorney, Agent, or Firm* — Oliff PLC

(57) ABSTRACT

An insulating element for sealing off a structural element in a motor vehicle, including a carrier and an expandable material that is arranged on the carrier. The insulating element has a top side and a bottom side which, in a state of use, are aligned substantially in a plane of a cross section of the structural element that is to be sealed off. In addition, the insulating element has at least one guide element, by means of which the insulating element can be arranged on a rail element, with the result that the rail element is arranged substantially perpendicularly to the top side and to the bottom side.

14 Claims, 6 Drawing Sheets

(51) Int. Cl.
  *B62D 29/00* (2006.01)
  *B62D 65/02* (2006.01)
(58) Field of Classification Search
  CPC ......... A61C 3/025; A61C 3/06; A61C 17/222; B82Y 40/00
  See application file for complete search history.

(56) References Cited

U.S. PATENT DOCUMENTS

| | | | |
|---|---|---|---|
| 6,387,470 B1 | 5/2002 | Chang et al. | |
| 7,637,559 B2* | 12/2009 | Browne | B62D 21/15 |
| | | | 296/187.02 |
| 8,215,704 B2* | 7/2012 | Monnet | B62D 29/002 |
| | | | 296/193.06 |
| 8,256,829 B2* | 9/2012 | Browne | B62D 29/00 |
| | | | 296/187.02 |
| 2006/0186701 A1* | 8/2006 | Browne | B62D 29/00 |
| | | | 296/187.02 |
| 2009/0066115 A1* | 3/2009 | Browne | B62D 21/15 |
| | | | 296/187.03 |
| 2011/0057392 A1* | 3/2011 | Monnet | B62D 29/002 |
| | | | 277/637 |

FOREIGN PATENT DOCUMENTS

| | | |
|---|---|---|
| WO | 98/36944 A1 | 8/1998 |
| WO | 2005/080524 A1 | 9/2005 |
| WO | 2008/080415 A1 | 7/2008 |

OTHER PUBLICATIONS

Mar. 7, 2023 International Preliminary Report on Patentability issued in International Patent Application No. PCT/EP2021/074607.

* cited by examiner

INSULATING ELEMENT

The invention relates to an insulating element for sealing off a structural element in a motor vehicle. The invention furthermore relates to a system having a plurality of such insulating elements and a rack, and to a method for attaching such insulating elements to structural elements.

Components, for example bodies and/or frames of transportation and conveyance means, in particular of aquatic or terrestrial vehicles or of aircraft, frequently have structures with cavities in order to make lightweight constructions possible. However, these cavities cause a wide variety of problems. Depending on the type of the cavity, the latter has to be sealed in order to prevent the ingress of moisture and dirt, which can lead to the corrosion of the components. It is often also desirable to substantially reinforce the cavities, and thus the component, but to retain the low weight. It is often also necessary to stabilize the cavities, and thus the components, in order to reduce noises which would otherwise be transmitted along or through the cavity. Many of these cavities have an irregular shape or a narrow extent, making it more difficult to seal, reinforce and insulate them properly.

In particular in automotive construction, but also in aircraft construction and boat building, sealing elements (baffles) are therefore used in order to seal and/or acoustically insulate cavities, or reinforcing elements (reinforcers) are used in order to reinforce cavities.

FIG. 1 schematically illustrates a body of an automobile. In this case, the vehicle body has various structures with cavities, for example pillars 14 and carriers or braces 12. Such structural elements 12, 14 with cavities are usually sealed or reinforced with insulating elements 16.

A disadvantage of the previously known sealing and/or reinforcing elements is that such parts often cannot be packed efficiently. Furthermore, when such parts are being transported, individual parts are repeatedly mixed up and damaged. In addition, application of such sealing and/or reinforcing elements is often not automatable because the individual elements are provided in an unordered manner.

It is therefore an object of the present invention to provide an improved insulating element for sealing off a structural element in a motor vehicle, which avoids the disadvantages of the prior art. In particular, it should be possible to pack and transport the insulating element more economically and, in addition, automation of use of the insulating elements should be simplified.

This object is achieved by an insulating element for sealing off a structural element in a motor vehicle, the insulating element comprising: a carrier; and an expandable material, which is arranged on the carrier; wherein the insulating element has a top side and a bottom side which, in a state of use, are aligned substantially in a plane of a cross section of the structural element that is to be sealed off, and wherein the insulating element has at least one guide element, by means of which the insulating element can be arranged on a rail element, with the result that the rail element is arranged substantially perpendicularly to the top side and to the bottom side.

This solution has the advantage, first of all, that an insulating element is thereby made available which can be stacked on rail elements and can be ordered in a correspondingly aligned manner. As a result, such insulating elements can be ordered for transport and packed and transported in the stacked state. On the one hand, this saves on transport costs because it allows the insulating elements to be packed in a more space-saving manner, with the result that in a given volume more insulating elements can be transported than was the case with conventional insulating elements. In addition, stacking such insulating elements offers the advantage that mixups between different insulating elements can be identified more easily. If, for example, a first insulating element is packed in a container with a plurality of second insulating elements, this is immediately noticeable because the first insulating element generally cannot be stacked with the second insulating elements. This makes it possible to greatly reduce mixups.

The insulating element proposed here furthermore offers the advantage that the individual insulating elements cannot be damaged as easily because of the stacked arrangement for transport and storage. Specifically, if the individual insulating elements are transported loosely in a container as before, the insulating elements will come into contact with one another many times, and damage can occur from time to time. However, if the insulating elements are transported in stacks or on rail elements, the number of times the insulating elements make mechanical contact with one another is greatly reduced. In addition, the insulating elements may be configured in such a way that the intended locations of contact have a robust form and/or one that is less prone to damage, and/or that locations of the insulating elements that are easier to damage are arranged at protected points which, for example, are covered by the adjacent insulating elements when stacked.

Furthermore, the insulating element proposed here offers the advantage that automated attachment of the insulating elements to structural elements in motor vehicles is made easier. Thus, for example, entire stacks of such insulating elements can be fed into a rack with a rail element, from where the individual insulating elements are correspondingly attached to the structural elements by a robot. In the case of loosely arranged insulating elements in a container, such an automated attachment of the insulating elements is significantly more difficult to accomplish.

The provision of one or more guide elements offers the advantage that ordering and stacking of the insulating elements is thereby greatly simplified and improved. By means of corresponding arrangement of the insulating elements on rail elements, it is already possible to make available units which can be used directly in an automated application method.

Furthermore, providing one or more identical guide elements or providing an identical distance between two guide elements makes it possible to arrange groups comprising different insulating elements on standardized racks or packages with rail elements. For example, a group with flat, step-like, large and small insulating elements can be arranged on the same rack with two rail elements as long as a distance between the guide elements is the same for each insulating element.

Logistics in production, transportation and application can thereby be substantially simplified and/or made substantially less expensive. In addition, automation during an application of the insulating elements in structural elements can be simplified by such standardization. As a result, it is not necessary to provide a large number of packages, racks, and application settings, leading to lower costs.

In the context of this invention, the term "insulating element" comprises elements for closing off and/or sealing off and/or closing and/or reinforcing and/or insulating a structural element. These various characteristics of such an insulating element can arise individually or in combination with one another.

In the context of this invention, the terms "top side" and "bottom side" mean the two main surfaces or the two largest side surfaces of the insulating element. Since the insulating elements are designed to close a cross section in a structural element, this means that the top side and the bottom side are each substantially in a plane of a cross section to be sealed off in a state of use. In this respect, the top side and the bottom side may also have a step-shaped character, that is to say it is not necessary for the top side and the bottom side to have a completely flat form.

In one exemplary embodiment, the fixing element is in the form of a clip.

In one exemplary embodiment, a height of the fixing element in a stacking direction is less than 8 mm, preferably less than 7 mm, particularly preferably less than 6 mm.

In one exemplary embodiment, a height at the base of the fixing element in the stacking direction that includes both a base of the fixing element and the expandable material at the base of the fixing element that is required to seal off the opening in the structural element in which the fixing element is inserted is at most 130% or at most 120% or at most 110% of a height of the fixing element in the stacking direction.

The advantage of the configuration of such relative heights is that it allows the insulating elements to be packed in a more space-saving manner.

In one exemplary refinement, the spacer element is configured to be stackable per se, wherein two spacer elements stacked one inside the other have a total height in the stacking direction of at most 170% or at most 160% or at most 150% or at most 140% or at most 130% of a height of an individual spacer element.

In one exemplary embodiment, the insulating element has at least two guide elements.

In one exemplary refinement, the guide elements are arranged on substantially opposite edges of the insulating element.

In one exemplary embodiment, the insulating element has at least three guide elements which are arranged on edges of the insulating element.

In one exemplary embodiment, at least one guide element is designed as an indentation.

In one exemplary embodiment, at least one guide element is designed as a projection.

In one exemplary embodiment, at least one guide element is designed as a projection and at least one guide element is designed as an indentation, wherein the guide element designed as a projection can be inserted into the guide element designed as an indentation.

In one exemplary embodiment, the guide element has an undercut in a cross section parallel to the top side or bottom side, with the result that the guide element is mechanically secured against displacement away from the rail element by a rail element having a correspondingly mating cross section.

In one exemplary embodiment, the insulating element has two guide elements, wherein the two guide elements have different cross sections parallel to the top side and bottom side, respectively.

In one exemplary embodiment, the cross sections of the rail elements are designed to be substantially complementary to the cross sections of the guide elements.

In one exemplary refinement, the cross sections of the two guide elements are not compatible with one another, and therefore each guide element can be arranged on only one correspondingly complementary rail element.

In a further exemplary refinement, at least one cross section of a guide element is of asymmetrical design, and therefore the insulating element can be arranged on a rail element of complementary design in only one spatial orientation position.

In a further exemplary refinement, both cross sections of the guide elements are of asymmetrical design, and therefore the insulating element can be arranged on the rail elements of complementary design in only one spatial orientation position.

In principle, various materials that can be made to foam can be used as the expandable material. In this case, the material may or may not have reinforcing properties.

Typically, the expandable material is made to expand thermally, by moisture or by electromagnetic radiation.

Such an expandable material typically has a chemical or a physical foaming agent. Chemical foaming agents are organic or inorganic compounds which decompose under the influence of temperature, moisture or electromagnetic radiation, wherein at least one of the decomposition products is a gas. Compounds which pass into the gaseous state of matter when the temperature is increased may be used for example as physical foaming agents. As a result, both chemical and physical foaming agents are capable of creating foam structures in polymers.

The expandable material is preferably foamed thermally, with chemical foaming agents being used. Examples of suitable chemical foaming agents are azodicarbonamides, sulfohydrazides, hydrogen carbonates or carbonates.

Suitable foaming agents are, for example, also commercially available under the trade name Expancel® from Akzo Nobel, the Netherlands, or under the trade name Celogen® from Chemtura Corp., USA.

The heat required for the foaming can be introduced by external or by internal heat sources, such as an exothermic chemical reaction. The foamable material is preferably foamable at a temperature of ≤250° C., in particular from 100° C. to 250° C., preferably from 120° C. to 240° C., preferably from 130° C. to 230° C.

Suitable expandable materials are, for example, one-component epoxy resin systems which do not flow at room temperature and in particular have increased impact resistance and contain thixotropic agents such as aerosils or nanoclays. For example, epoxy resin systems of this type include 20 to 50% by weight of a liquid epoxy resin, 0 to 30% by weight of a solid epoxy resin, 5 to 30% by weight of impact modifiers, 1 to 5% by weight of physical or chemical foaming agents, 10 to 40% by weight of fillers, 1 to 10% by weight of thixotropic agents and 2 to 10% by weight of heat-activatable catalysts. Suitable impact modifiers are reactive liquid rubbers based on nitrile rubber or derivatives of polyether polyol polyurethanes, core-shell polymers and similar systems known to a person skilled in the art.

Likewise suitable expandable materials are one-component polyurethane compositions containing foaming agents and based on crystalline polyesters which comprise OH groups and have been mixed with further polyols, preferably polyether polyols, and polyisocyanates with blocked isocyanate groups. The melting point of the crystalline polyester should be ≥50° C. The isocyanate groups of the polyisocyanate can be blocked for example by nucleophiles such as caprolactam, phenols or benzoxalones. Also suitable are blocked polyisocyanates as are used, for example, in powder-coating technology and are commercially available, for example, under the trade names Vestagon® BF 1350 and Vestagon® BF 1540 from Degussa GmbH, Germany. Suitable isocyanates are also so-called encapsulated or surfacedeactivated polyisocyanates, which are known to a person skilled in the art and are described, for example, in EP 0 204 970.

Also suitable as expandable materials are two-component epoxy/polyurethane compositions which contain foaming agents, as are described, for example, in WO 2005/080524 A1.

Also suitable as expandable materials are ethylene-vinyl acetate compositions containing foaming agents.

Expandable materials that are also suitable are marketed by Sika Corp., USA, for example under the trade name SikaBaffle® 240, SikaBaffle® 250 or SikaBaffle® 255, and are described in U.S. Pat. Nos. 5,266,133 and 5,373,027. Such expandable materials are particularly preferred for the present invention.

Preferred expandable materials having reinforcing properties are, for example, those which are marketed under the trade name SikaReinforcer® 941 by Sika Corp., USA. These are described in U.S. Pat. No. 6,387,470.

In one exemplary embodiment, the expandable material has an expansion rate from 800% to 5000%, preferably from 1000% to 4000%, particularly preferably from 1500% to 3000%. Expandable materials having such expansion rates afford the advantage that, as a result, reliable sealing and/or sealing off of the structural element with respect to liquids and sound can be achieved.

In one exemplary embodiment, the expandable material is in the form of a temperature-stimulated material.

This has the advantage that, as a result, the furnace for baking the dip coating liquid can be used to expand the expandable material and to thus seal off the cavity. Consequently, an additional work step is not necessary.

The carrier may consist of any desired materials. Preferred materials are plastics, in particular polyurethanes, polyamides, polyesters and polyolefins, preferably polymers which can withstand high temperatures such as poly(phenylene ethers), polysulfones or polyether sulfones, which in particular are also foamed; metals, in particular aluminium and steel; or grown organic materials, in particular wood materials or other (densified) fibrous materials, or glass-type or ceramic materials; especially also foamed materials of this type; or any desired combinations of these materials. Polyamide, in particular polyamide 6, polyamide 6.6, polyamide 11, polyamide 12, or a mixture thereof, is particularly preferably used.

Furthermore, the carrier may be solid, hollow and/or foamed and/or have a grid-like structure, for example. Typically, the surface of the carrier can be smooth, rough or structured.

In the case of insulating elements in which the expandable material is located on a carrier, the production process differs according to whether the carrier consists or does not consist of a material that can be processed by injection molding. If this is the case, a two-component injection molding process is usually used. Here, first of all a first component, in this case the carrier, is injected. After said first component has solidified, the cavity in the mold is enlarged, or adapted, or the molding produced is placed into a new mold, and a second component, in this case the expandable material, is overmolded onto the first component by a second injection apparatus.

If the carrier consists of a material that cannot be produced by the injection molding process, that is to say for example consists of a metal, the carrier is placed into a corresponding mold and the expandable material is overmolded onto the carrier. Of course, it is also possible to fasten the expandable material to the carrier by specific fastening means or processes.

Furthermore, carriers can also be produced by other processes, for example by extrusion.

The insulating element has a stack height which corresponds to an additional height in the stacking direction of a stack having insulating elements by which the stack grows when a further insulating element is stacked onto the stack.

In one exemplary embodiment, a stack height of the insulating element is at most 80%, preferably at most 70%, preferably at most 60%, preferably at most 50%, preferably at most 40%, preferably at most 30%, of a total height of an individual insulating element in the stacking direction.

This has the advantage that it allows the insulating elements to be arranged in a stack in a more space-saving manner. A stronger vertical nesting of adjacent insulating elements in a stack moreover improves the stability of the overall stack.

The object set out in the introduction is furthermore achieved by a group comprising at least two insulating elements, wherein the insulating elements have a different shape, and wherein a distance between the two guide elements is the same for all of the insulating elements.

In one preferred refinement, the group comprises at least three or at least four or at least five or at least six insulating elements, each having a different shape.

The provision of such a group of insulating elements has the advantage that, by virtue of the constant distance, the different insulating elements can be arranged on the same rail elements. As a result, logistics during transportation and application of the insulating elements can be made more cost-effective and simpler.

The object set out in the introduction is moreover achieved by a system having a plurality of insulating elements and at least one rack, in which the insulating elements are arranged.

In one exemplary embodiment, the system comprises at least 10 or at least 15 or at least or at least 25 or at least 30 stacked insulating elements.

In a further exemplary embodiment, the system comprises at most 150 or at most 120 or at most 100 or at most 80 or at most 60 stacked insulating elements.

In one exemplary embodiment, each additional insulating element increases the height of the stack by at most 20 mm, particularly preferably by at most 18 mm, particularly preferably by at most 16 mm, particularly preferably by at most 14 mm, particularly preferably by at most 12 mm, particularly preferably by at most 10 mm.

The tight stacking of insulating elements has the advantage that it allows the insulating elements to be packed more efficiently.

In one exemplary embodiment, a stack height of an individual insulating element is at most 80%, preferably at most 70%, preferably at most 60%, preferably at most 50%, preferably at most 40%, preferably at most 30%, of a total height of an individual insulating element in the stacking direction.

The tight stacking of insulating elements in turn has the advantage that it allows the insulating elements to be packed more efficiently.

In one exemplary embodiment, the rack has two rail elements, which run parallel to one another.

In one exemplary embodiment, a distance between the two parallel rail elements can be changed, thus enabling the rack to be adapted to insulating elements having different distances between the guide elements.

In one exemplary embodiment, the rack has at least one stopper element, which can selectively stop or release a displacement of the insulating elements clamped in the rack in the direction of the rail elements.

The object set out in the introduction is moreover achieved by a method for attaching insulating elements to structural elements in motor vehicles, the method comprising the steps of: providing a plurality of insulating elements according to the above description; arranging the insulating elements on rail elements, wherein the insulating elements are each arranged on rail elements at the guide elements; and applying individual insulating elements by means of an application robot, wherein the application robot removes individual insulating elements from the rail elements and attaches them to a structural element.

In one exemplary embodiment, the method comprises the following additional step: transporting the plurality of insulating elements from a production location of the insulating elements to a processing location of the insulating elements, wherein the insulating elements are arranged in respective groups in a package on rail elements.

In a further exemplary embodiment, the insulating elements are arranged on the rail elements in a rack.

Details and advantages of the invention will be described below on the basis of exemplary embodiments and with reference to schematic drawings, in which.

Figure 1:
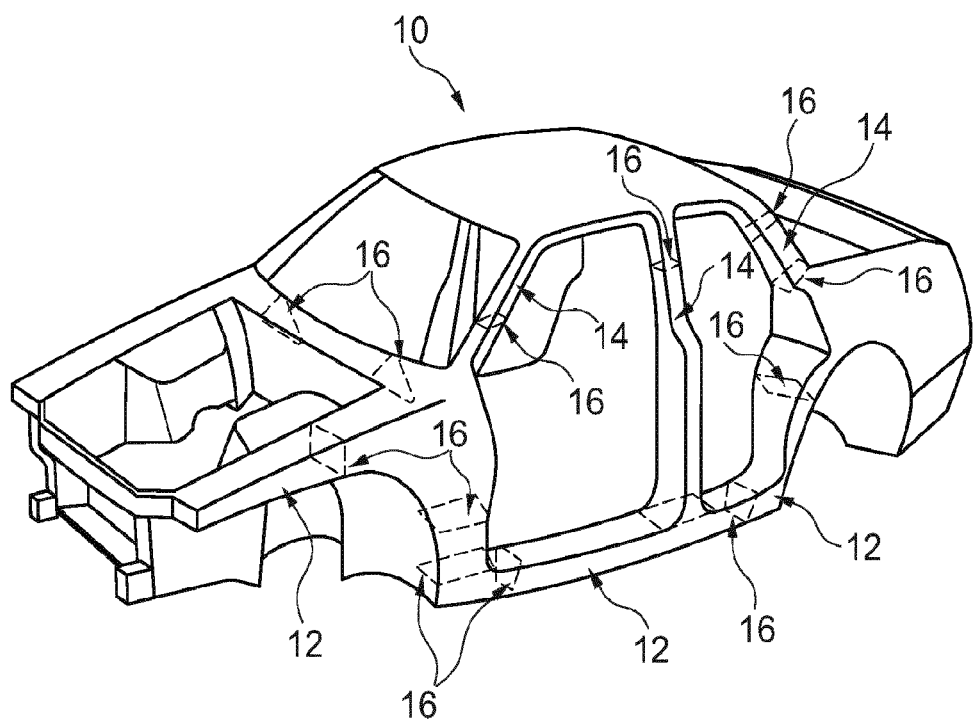
FIG. 1 shows an exemplary illustration of a vehicle body.
Figure 2A:
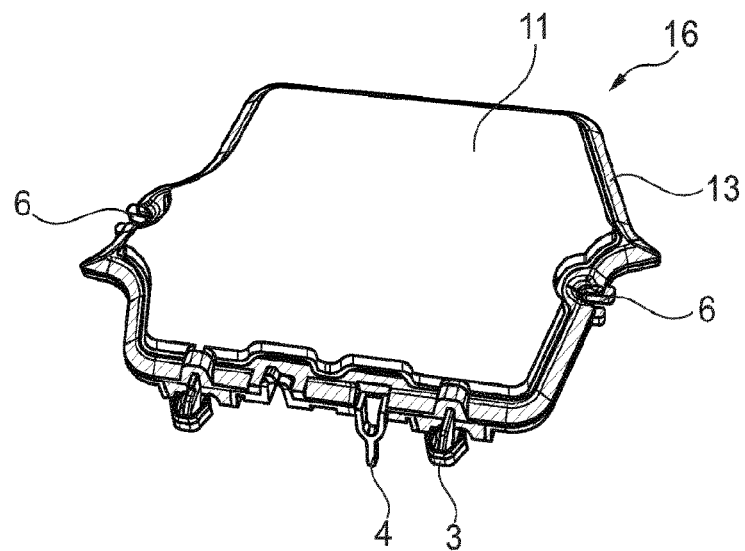
FIGS. 2a to 2c show schematic illustrations of an exemplary insulating element.
Figure 2B:
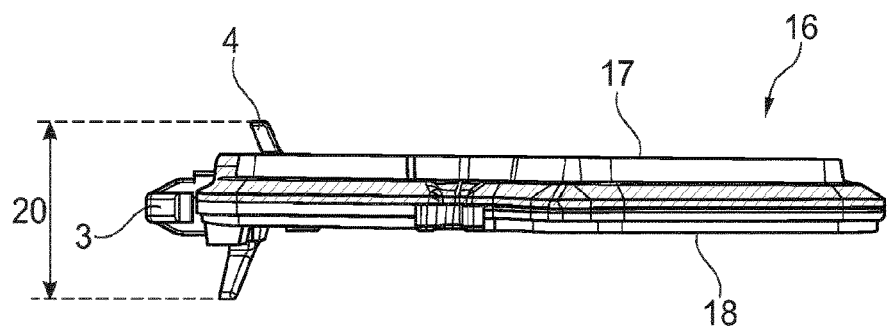
Figure 2C:
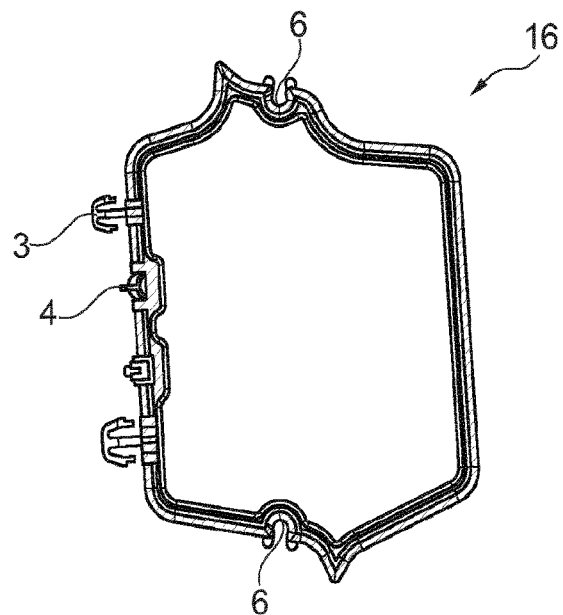

FIGS. 2a to 2c schematically illustrate an exemplary insulating element 16. The insulating element 16 comprises a carrier 11 and an expandable material 13 arranged thereon. The carrier 11 has a top side 17 and a bottom side 18. Furthermore, the carrier 11 has guide elements 6, by means of which the insulating element 16 can be arranged on a rail element (not illustrated). In this exemplary embodiment, two mutually opposite guide elements 6 are formed, and the guide elements 6 are each formed as an indentation.

Moreover, the insulating element 16 comprises spacer elements 4 and fixing elements 3 for prefixing the insulating element 16 in a structural element.

The insulating element 16 has a height 20 which is measured substantially perpendicularly to the top side 17 or bottom side 18.

Figure 3A:
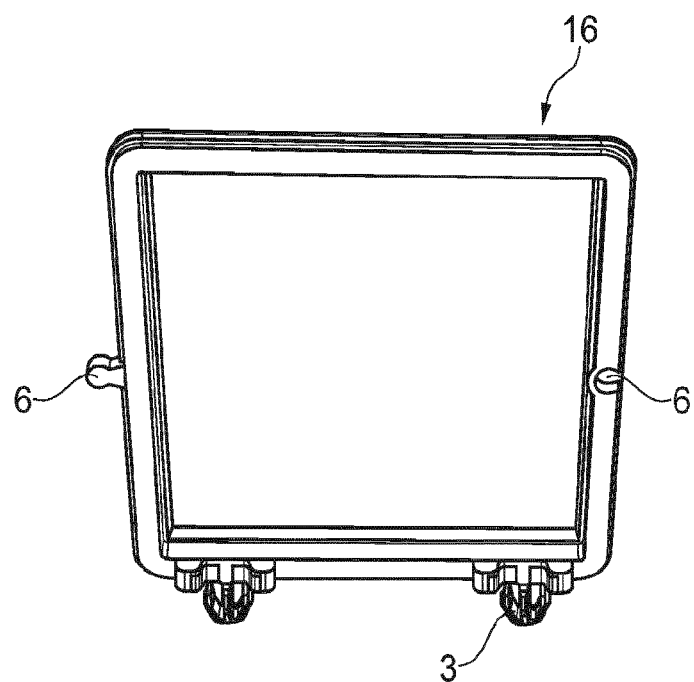
FIGS. 3a and 3b show schematic illustrations of exemplary insulating elements.
Figure 3B:
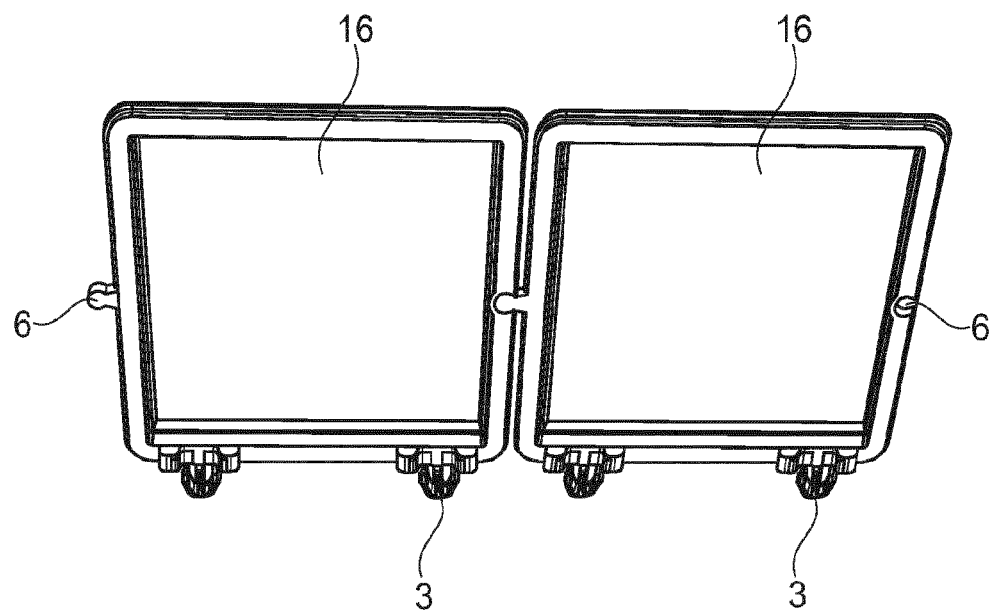

FIGS. 3a and 3b schematically illustrate further exemplary insulating elements 16. In this case, each insulating element 16 has a first guide element 6, which is designed as an indentation, and a second guide element 6, which is designed as a projection. The projection and the indentation each have complementary cross sections, thus enabling adjacent insulating elements 16 to be connected to one another by the guide elements 6. In this example, the cross sections of the guide elements 6 are furthermore formed with an undercut, ensuring that the insulating elements 16 are mechanically secured against displacement in a plane parallel to the top side 17 or bottom side 18.

Figure 4:
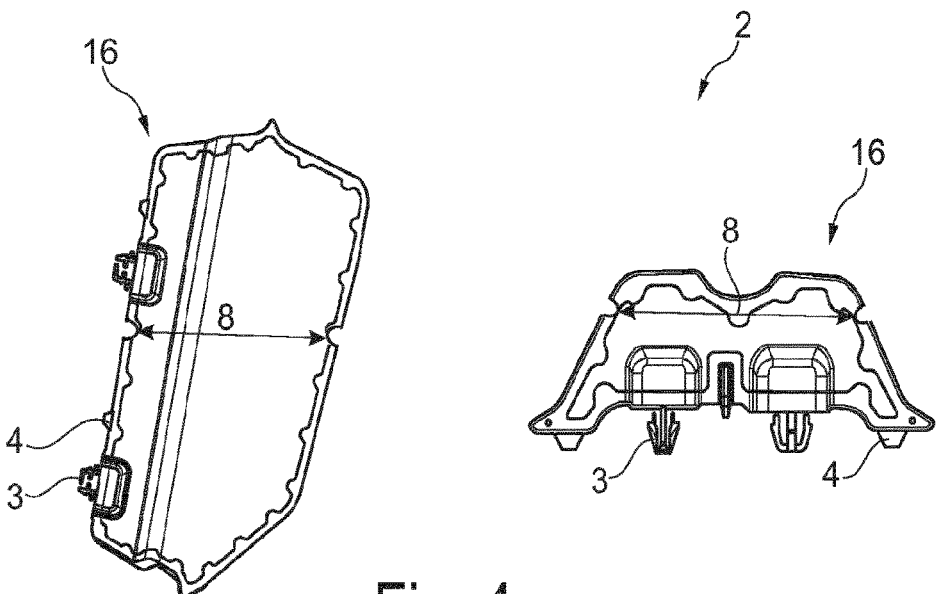
FIG. 4 shows schematic illustrations of an exemplary group of insulating elements.

FIG. 4 illustrates schematically a group 2 of different insulating elements 16. Here, the different insulating elements 16 each have two guide elements 6 which are spaced apart from one another by a distance 8. This distance 8 is the same for all insulating elements 16 within the group 2. This has the advantage that, as a result, all the insulating elements 16 of the group 2 can be fed into an identical rack (not illustrated).

Figure 5A:
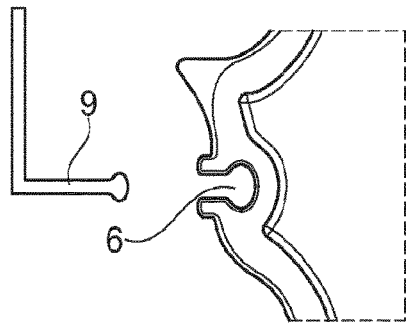
FIGS. 5a to 5d show schematic illustrations of exemplary cross sections through guide elements and rail elements.
Figure 5B:
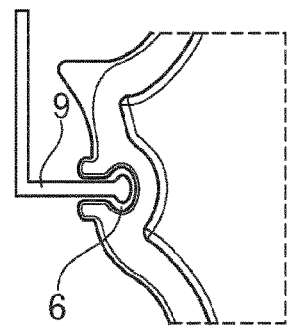
Figure 5C:
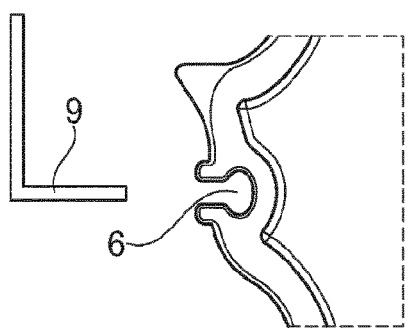
Figure 5D:
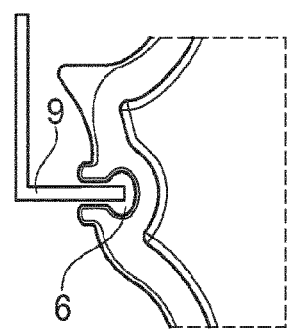

FIGS. 5a to 5d illustrate schematically, by way of example, cross sections of guide elements 6 of the insulating elements and rail elements 9. In FIGS. 5a and 5b, the cross sections are each formed with an undercut, ensuring that the insulating element is mechanically secured against movement away from the rail element 9. In FIGS. 5c and 5d, on the other hand, the rail element 9 has a cross section without an undercut.

Figure 6A:
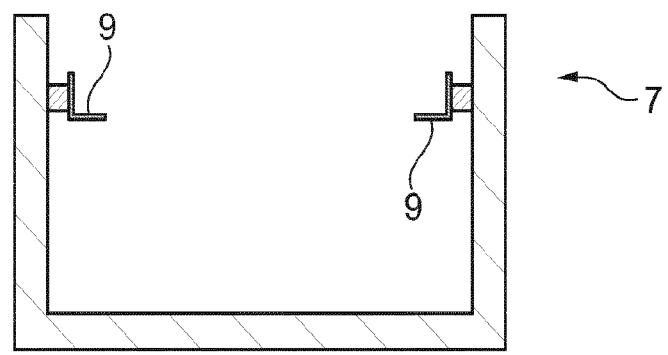
FIGS. 6a to 6c show a schematic illustration of an exemplary rack and a system consisting of a rack and insulating elements arranged therein.
Figure 6B:
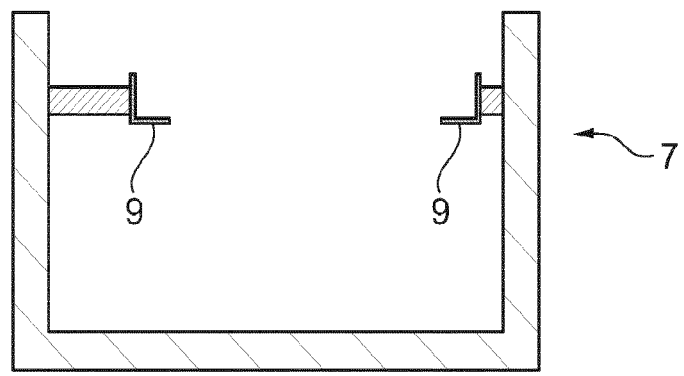
Figure 6C:
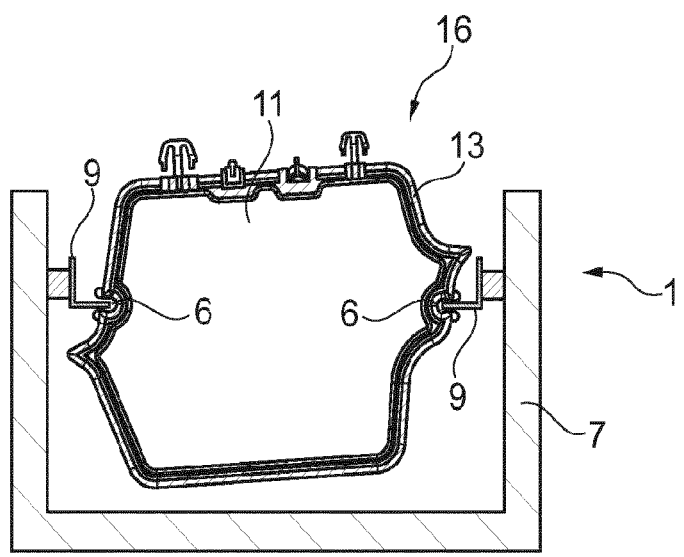

FIGS. 6a to 6c respectively illustrate schematically a rack 7 and a system 1 consisting of a rack 7 and insulating elements 16 arranged therein. In this exemplary embodiment, the rack 7 has a movable rail element, thus making it possible to vary a distance between the parallel rail elements 9. This enables the rack 7 to be adapted to insulating elements 16 with different distances 8 between the guide elements 6.

Figure 7A:
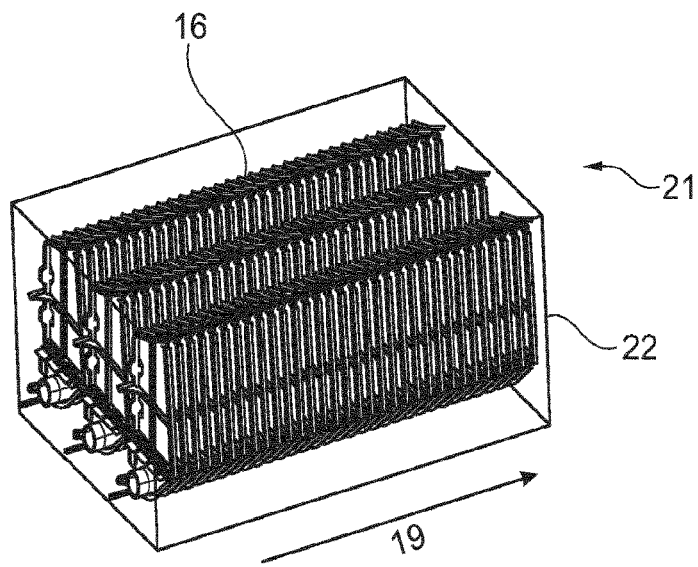
FIGS. 7a to 7c show a schematic illustration of an exemplary method for attaching insulating elements to structural elements.
Figure 7B:
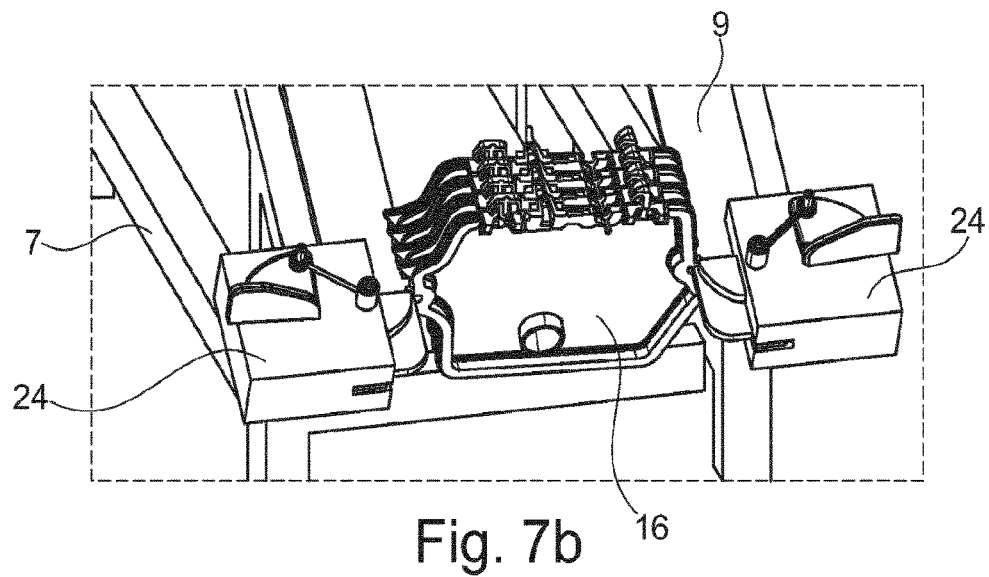
Figure 7C:
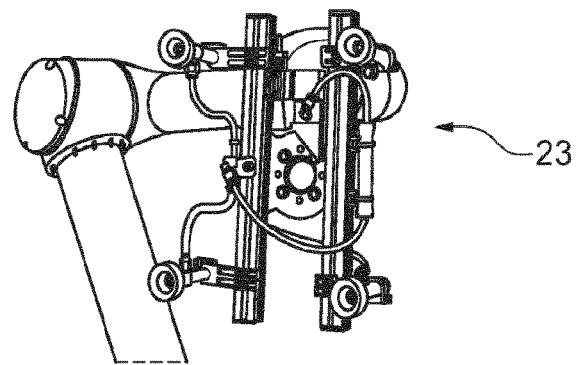

Finally, FIGS. 7a to 7c schematically illustrate an exemplary method for attaching insulating elements 16 to structural elements. FIG. 7a shows a packaging unit 21 comprising a package 22 and insulating elements 16 arranged in stacks therein. Here, the insulating elements 16 are all aligned in such a way that the stacking direction 19 for all the stacks in the package 22 runs in the same direction. Such stacks of insulating elements 16 are then fed into a rack 7 having rail elements 9 (FIG. 7b). In this exemplary embodiment, the rack furthermore has stopper elements 24, which can stop and selectively release the insulating elements 16 at one end of the rail element 9. The individual insulating elements 16 are then removed from the rack 7 by an application robot (FIG. 7c) and attached to a structural element (not illustrated).

LIST OF REFERENCE SIGNS

1 System
2 Group
3 Fixing element
4 Spacer element
6 Guide element
7 Rack
8 Distance between guide elements
9 Rail element
Vehicle body
11 Carrier
12 Structural element
13 Expandable material
14 Structural element
16 Insulating element
17 Top side
18 Bottom side
19 Stacking direction
20 Height of the insulating element
21 Packaging unit
22 Package
23 Application robot
24 Stopper element

The invention claimed is:

1. An insulating element for sealing off a structural element in a motor vehicle, the insulating element comprising:
   a carrier; and
   an expandable material, which is arranged on the carrier, wherein the insulating element has a top side and a bottom side which, in a state of use, are aligned substantially in a plane of a cross section of the structural element that is to be sealed off, wherein
   the insulating element has a guide element, by which the insulating element can be arranged on a rail element, with the result that the rail element is substantially perpendicular to the top side and to the bottom side, and
   the guide element has an undercut in a cross section parallel to the top side or bottom side, with the result that the guide element is mechanically secured against displacement away from the rail element by the rail element having a correspondingly mating cross section.

2. The insulating element as claimed in claim 1, wherein the insulating element has a second guide element and the guide element and the second guide element are on substantially opposite edges of the insulating element.

3. The insulating element as claimed in claim 2, wherein the second guide element is a projection.

4. The insulating element as claimed in claim 2, wherein the guide element can be inserted into the second guide element.

5. The insulating element as claimed in claim 1, wherein a stack height of the insulating element is at most 50% of a height of the insulating element.

6. A group comprising at least two insulating elements as claimed in claim 2, wherein the insulating elements have a different shape, and wherein a distance between the guide element and the second guide element is the same for all of the insulating elements.

7. A system having a plurality of insulating elements as claimed in claim 1 and a rack having at least one rail element, wherein the insulating elements are on the rail element at the guide elements, and outlines of the insulating elements substantially coincide in the direction of the rail element.

8. The system as claimed in claim 7, wherein the rack has two rail elements, which run parallel to one another.

9. The system as claimed claim 8, wherein a distance between the two rail elements can be changed, thus enabling the rack to be adapted to insulating elements having different distances between the guide elements.

10. The system as claimed in claim 7, wherein the rack has at least one stopper element, which can selectively stop or release a displacement of the insulating elements clamped in the rack in the direction of the rail elements.

11. A method for attaching insulating elements to structural elements in motor vehicles, the method comprising:
    providing a plurality of insulating elements as claimed in claim 1;
    arranging the insulating elements on rail elements, wherein the insulating elements are each arranged on rail elements at the guide elements; and
    applying individual insulating elements with an application robot, wherein the application robot removes individual insulating elements from the rail elements and attaches them to a structural element.

12. The method as claimed in claim 11, wherein the method comprises:
    transporting the plurality of insulating elements from a production location of the insulating elements to a processing location of the insulating elements, wherein the insulating elements are arranged in respective groups in a package on rail elements.

13. The method as claimed in claim 11, wherein the insulating elements are arranged on the rail elements in a rack.

14. An insulating element for sealing off a structural element in a motor vehicle, the insulating element comprising:
    a carrier; and
    an expandable material, which is arranged on the carrier, wherein the insulating element has a top side and a bottom side which, in a state of use, are aligned substantially in a plane of a cross section of the structural element that is to be sealed off, wherein
    the insulating element has a guide element, by which the insulating element can be arranged on a rail element, with the result that the rail element is substantially perpendicular to the top side and to the bottom side,
    the insulating element has a second guide element and the guide element and the second guide element are on substantially opposite edges of the insulating element, and
    the guide element can be inserted into the second guide element.

* * * * *